J. F. G. P. HARTMANN.
ELECTRIC CONTACT DEVICE.
APPLICATION FILED APR. 20, 1920.

1,365,491.  Patented Jan. 11, 1921.
3 SHEETS—SHEET 1.

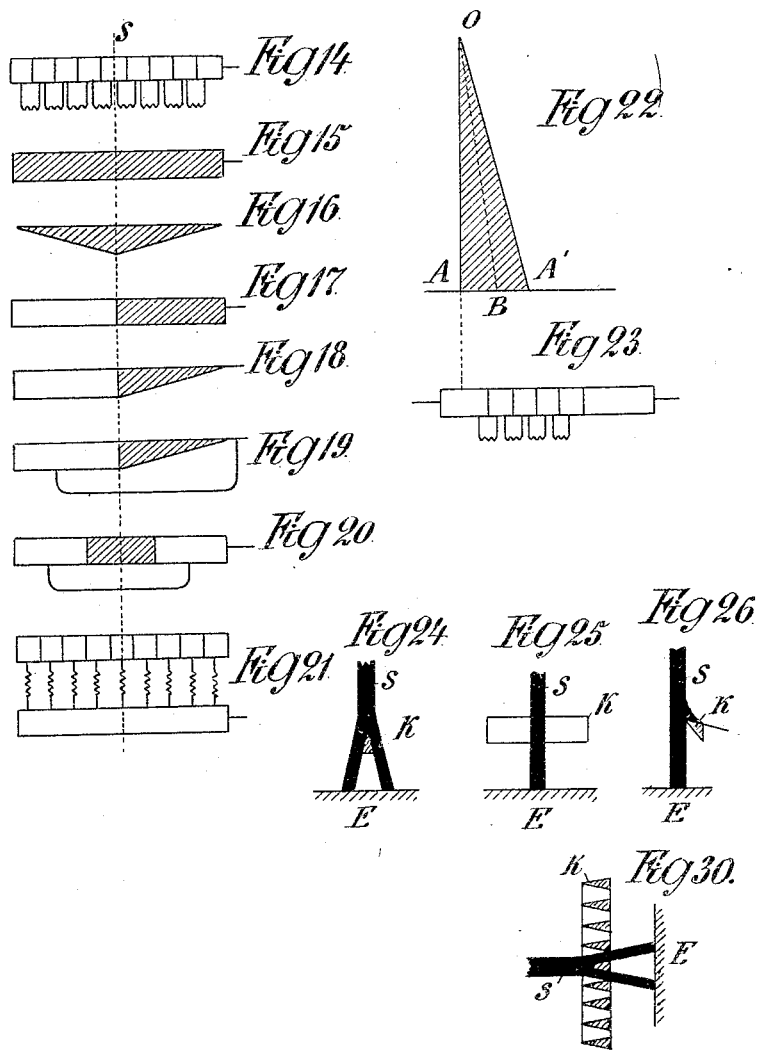

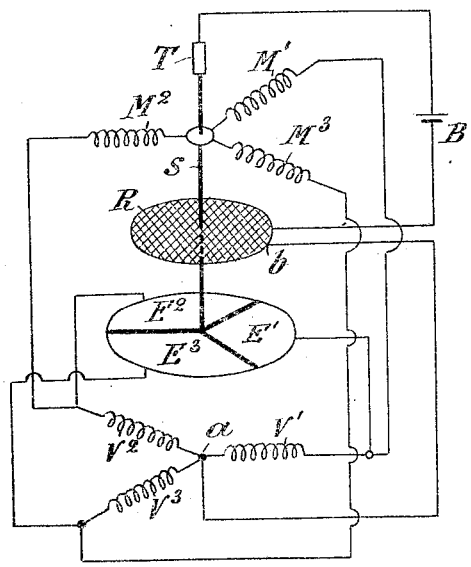

UNITED STATES PATENT OFFICE.

JULIUS FREDERIK GEORG POUL HARTMANN, OF COPENHAGEN, DENMARK.

ELECTRIC-CONTACT DEVICE.

1,365,491.  Specification of Letters Patent.  Patented Jan. 11, 1921.

Application filed April 20, 1920. Serial No. 375,408.

*To all whom it may concern:*

Be it known that I, JULIUS FREDERIK GEORG POUL HARTMANN, a subject of the King of Denmark, residing at Kastelsvej 3, Copenhagen, Denmark, have invented a new and useful Improvement in Electric-Contact Devices; and I do hereby declare the following to be a full, clear, and exact description of the same.

The invention relates to an electric contact device, which for instance can be used in rectifiers for alternating current, for interrupters, commutators, regulating resistances, etc. The novelty in this contact device essentially consists in the fact that the movable contact part of the same is formed of one or a plurality of conducting liquid bridges which are produced in such a manner that in a conducting liquid jet, for instance a mercury jet, outside the jet orifice of the same, are introduced two or more electrodes, which are thus conductingly connected through part of the liquid jet, *i. e.* through a conducting liquid bridge. By moving the striking point or points of the jet on the electrodes and forming or combining these latter in a suitable manner, it is possible to close or interrupt one or a plurality of circuits or reverse a direction of current. The liquid bridge hereby acts in the same manner as for instance the movable contact body in an electric interrupter or regulating resistance.

The invention is shown diagrammatically in the drawing, where—

Figures 1 and 2 show a conducting liquid jet seen from the side and from above respectively, which is directed against the sharpened edge of an insulating partition wall between two electrodes, Fig. 3 a combination of electrodes seen from above, Figs. 4—7 diagrams for illustration of the use of the invention in rectifiers, Figs. 8—12 various modifications of interrupters, regulating resistances, etc., Fig. 13 an automatically acting speed regulator for an electric direct current generator, Fig. 14 a regulating resistance with oscillating contact, Figs. 15 to 20 some diagrams illustrating various arrangements of the resistance, Fig. 21 another form for a regulating resistance with oscillating contact,

Fig. 22 a diagram,

Fig. 23 a regulating resistance,

Figs. 24 to 31 various forms for the conducting liquid bridge and the electrodes or splitting organs for the liquid jet to be used for production of the liquid bridge, and Fig. 32 a rectifier.

The principle of the conducting liquid bridge will firstly be explained under reference to Figs. 1 and 2. Here S is a conducting liquid jet which is directed against the sharp edge of an insulating plate or wall $P^1$, which separates the two conducting pieces E and $E^1$. Between these pieces the jet will form a conducting bridge or contact across the edge of the insulator. The jet may have a thickness which is smaller than that of the insulating plate if only it is directed against the edge of the rim, as the liquid will then be forced down along the two oblique sides of the plate and thereby form the connection. If it be imagined that the jet in some way or other is brought to move in a plane containing the edge of the plate $P^1$, or, if the edge is not straight, in a surface containing this edge, the jet will during the movement continuously form the said bridge. On this is contingent a series of important applications of the system in question.

*Employment in rectifiers for alternating current.*

It must first be explained how the system can be used for rectification of a single phase alternating current. For this purpose one of the conducting pieces $E^1$ is divided into two uniform halves $E^2$ and $E^3$, Fig. 3, and these pieces are separated by an insulating wall P, which may suitably have the same profile as the wall $P^1$ which in Figs. 1 and 2 separates the electrodes E and $E^1$. The liquid jet, which will generally be a mercury jet, is directed against the point where the insulating walls P and $P^1$ abut. In a manner which will be explained below, the striking point of the jet, thus the conducting bridge, is brought to oscillate on both sides of the plate P synchronously with the alternating current to be rectified and in such a manner that the bridge passes the edge of P at the moment the said alternating current is reversed. When this is attained the two components of an alternating current which is supplied through the electrode E can be separated by removing one component through E² and the other through E³.

The manner in which the striking point of the jet can be brought to oscillate synchronously with an alternating current and caused to pass the edge of P at the said moment of the phase, is explicitly indicated in Danish Patent No. 23352, wherefore a short explanation will here suffice. In Fig. 4 S designates the liquid jet, F an alternating field the lines of force of which are perpendicular to the edge of the plate P¹ and which is fed with current from the generator which delivers the alternating current to be rectified. B is a source of direct current, for instance an accumulator cell, and the same sends current through the jet. The currrent can be led in through the jet tube and out through the electrode piece E with which the jet is continuously in conducting connection through the one half of the conducting liquid bridge. The interaction between the alternating field and the direct current will form a continuous series of waves on the jet which proceed at the speed of the jet thereby causing the striking point of the jet, thus the said bridge, to oscillate synchronously with the alternating field. Instead of sending a direct current through the jet and cause the jet to pass an alternating field, an alternating current may be sent through the jet, which is synchronous with that to be rectified, and let the field be a constant field. Fig. 5 indicates this arrangement; V designates the secondary winding of a transformer which supplies the (small) current effect demanded for maintaining the current through the jet. On the jet, as in the device shown in Fig. 4, a continuous series of waves are formed which produce the synchronous oscillations of the conducting bridge.

In Figs. 6 and 7 are shown two systems for the rectification of alternating current in accordance herewith.

In Fig. 6 V is the source of alternating current, for instance the secondary winding of a transformer. From V alternating current is led to the electrode E. The one half period of the alternating current is led away through E², the other through E³. In each of the two circuits E², $b^1$, $a$ and E³, $b^2$, $a$ is thus obtained a pulsatory direct current.

In the arrangement shown in Fig. 7 the line $b—d$ is not divided, whereas the source of current is divided into two uniform halves $V_1$ and $V_2$. The conducting bridge is to pass the edge of the insulating wall P at the moment when the tension for $V_1$, $V_2$ respectively is reversed. Through the line $b—d$ will then flow a continuous pulsatory current consisting of the two components of the alternating current connected to the same side.

Generally a series of distances from the field F, Fig. 4, to the electrodes will be found at which these latter can be adjusted, to cause the conducting bridge to pass the edge of the insulating wall P at the right moment for obtaining a complete rectification. The serviceable electrode positions will then form a row with a distance between two consecutive positions equal to the distance through which the parts of the currentless jet would move during the half period of the alternating current. During the passage from one position of electrode to the following the rectified current is reversed. By commutation of the field or of the current sent through the jet, the rectified current may again be reversed.

*Employment in interrupters, commutators, regulating resistances, etc.*

The conducting bridge formed by the liquid jet has a series of important applications beyond those above named. Especially the jet bridge can be used as an exceedingly quickly acting interrupter, commutator or regulator. In Figs. 8—12 are shown several such applications of the invention.

Fig. 8 shows a combined electrode of the same type as that shown in Fig. 3. P and P¹ designate, as before, the insulating partition walls. The black circular surface represents the striking point of the jet in the electrode, thus the bridge. The jet can for instance pass a magnetic field, generally a direct field. The lines of force of the same are as before perpendicular to the edge of P¹.

Through the jet is sent a current, preferably a direct current. By varying this current or the field the bridge can be moved along the edge of P¹. The time elapsing from the moment when the altering of the current or the field is commenced until the the bridge starts moving, is approximately equal to the time used by the parts of the currentless jet in moving from the field to the electrode. It must be presumed that the jet bridge when no current is passing through the jet forms a connection between E and E² and as the current increases through the jet moves toward P; it is then seen that the apparatus when the current has attained a certain intensity, will close connection between E and E³ and therewith the circuit indicated by $a—b$. The apparatus can be used for automatically closing a circuit when a current flowing through the jet or the winding of the field magnet passes above a certain limit. If the unbent jet strikes the wall P¹ between E³ and E and the striking point of the jet moves with an increasing current from the right toward the left, the apparatus can be used for interrupting a circuit when a current has attained a certain higher limit (maximum interrupter); finally it will be understood that an apparatus of the type shown can be used for closing or interrupting a circuit when the current through the jet or the magnet winding passes down below a certain limit.

Fig. 9 shows a double poled interrupter or closer of current which is produced by a combination of two apparatus of the kind shown in Fig. 8.

Fig. 10 shows a commutator the manner of acting of which is easily understood from the drawing.

In Fig. 11 one side of the electrode is divided into more than two parts. Between the individual parts of the one half are inserted current controlling means such as resistance elements $r$, which can be cut out one by one by means of the circuit indicated by $a-b$ through regulating of the current through jet or the winding of the magnetic field.

In Fig. 12 is shown a modified form for a regulating resistance, the manner of acting of which demands no further explanation. The resistance elements $r$ of course may be replaced by other electric parts of a circuit of any kind, for instance magnet windings, self-induction coils, windings of a transformer, condensators, relays or the like.

As an example of more complex applications of the principle of the invention I have shown in Fig. 13 the diagram of an automatically acting speed regulator for an electric direct current generator. A is the armature of the same, M the magnet winding, and $K_1$, $K_2$ the current conductors. Into one of these latter is built a shunt $Sh$, from the poles of which the jet S in the speed regulator is provided with current. The current regulating means such as the resistance $r_1, r_2 \ldots r_5$ is inserted in series with the magnet winding. In case the current in $K_1$, $K_2$ increases, the current through S is likewise increased. Thereby the jet is bent in such a manner that the jet bridge is moved to the right, whereby elements of the regulating resistance are cut out, and the decrease of tension due to the increasing of the current is met. An improvement in the speed regulator here described consists in compensation being made for the normal decrease of tension in the shunt $Sh$ in such a manner that at normal intensity of current in $K_1$, $K_2$ no current passes through the jet of the regulator. The compensation can be effected by means of an accumulator cell C inserted in series with the jet. In the described arrangement the field of the regulator is presumed to be a direct field, which may be produced by a permanent magnet. The magnet, however, may also be an electromagnet, the winding of which is inserted in series with the jet, or finally the winding may be directly connected with the poles of the generator. The latter arrangement, however, is not as simple in principle as the former.

In the above described arrangements for insertion of resistance elements or other electric organs the field is presumed to be a direct field, and the current by which the position of the jet is controlled, is presumed to be a direct current. It will now be proved that it is possible, even in more ways, to effect a regulation by means of a jet which conducts alternating current in a direct field or direct current in an alternating field or finally alternating current in a synchronous alternating field.

*Regulating resistances with oscillating contact.*

Fig. 14 shows a regulating resistance with a jet S. If this latter conducts alternating current in a constant field or direct current in an alternating field, it will oscillate symmetrically around the zero position. If all of the resistance elements are of the same intensity, or the resistance is evenly apportioned, as indicated in the diagram shown in Fig. 15, the average resistance will not be altered through the oscillation of the jet. If on the contrary the magnitude of the resistance is caused to decrease outward from the zero position, *vide* Fig. 16, the average resistance will decrease with increasing amplitude, and a regulation controlled by the amplitude is obtained. The same is attained by the arrangement of resistance elements to the right of the zero position, as indicated in Figs. 17 and 18. It is hereby presumed that when the jet strikes the part of the electrode which is not provided with resistance elements, the current will have to pass all the elements arranged in series in the right half; but of course the current can be led around about through a wire which either does not contain any resistance or which contains a suitably chosen resistance, *vide* Fig. 19. Further the resistance may be built as shown in Fig. 20, where the jet oscillates beyond the parts provided with resistance elements. Instead of using the type of regulating resistances shown in Fig. 14, the type shown in Fig. 21 may be used. The forms of regulating resistances indicated must be considered only as examples for illustration of a few possibilities for employing the invention.

If the same alternating current is sent through the jet and the winding of the magnet, a jet fan appears as indicated in Fig. 22. If O, A designates the position of the currentless jet, one limit of the fan $AOA^1$ will be OA, the jet thus oscillating on an equilibrium OB which is laterally displaced in relation to the equilibrium of the currentless jet. If the jet oscillates over a regulating resistance with evenly apportioned resistance as shown in Fig. 15, the circumstances will be quite the same as if the jet were stationarily bent into the position OB, or as if the resistance elements between A and B were cut out. Therefore the device is especially adapted for regulating alternating current. Also here the current controlling means such as the resistance may be built in various manners, for instance as shown in Fig. 23, where the oscillations of the jet can reach outside the row of resistance elements.

*Various modifications of the conducting liquid bridge.*

By Figs. 1 and 2 is illustrated an arrangement for the production of a conducting liquid bridge. Such bridge, however, can be formed in various manners and below will be mentioned a few simple forms.

Figs. 24 and 25 show, viewed from the side and from front respectively, an arrangement at which is led into the jet S a wedge shaped conducting strip K, which splits the jet into two branches. The strip is disposed in the plane in which the jet when used oscillates or is bent. Normally it replaces the electrode piece E in Fig. 3. In effect it can be used as a common point for the three circuits each of the two parts into which the jet is split forming a conducting bridge, each of which can end on an electrode.

Fig. 26 shows a somewhat modified arrangement at which the jet touches a wedge shaped strip K which replaces E in Fig. 3.

In Figs. 27 and 28 is shown a fourth arrangement. Here the jet strikes a conducting piece H, which is provided with a row of jet holes $h$ which are entered by conical borings overlapping one another so that in the piece H is formed a lengthened hollow. The jet is to go down into the same. If the jet just strikes a boring, it is continued in one single jet. If it strikes the partition wall between two neighboring borings, two jets are formed. The piece H here substitutes the electrode E in Fig. 3. It must be remarked that if it is desired to give the secondary jets in the last described arrangement a direction different than the main jet, this can be done by forming the entrance to the holes $h$ in H as shown in Fig. 29.

In certain cases an arrangement may be used where the jet strikes a grating which is formed of edgewise arranged strips, Fig. 30, or of extended threads, Fig. 31. Finally the grating can be substituted by a thread net. The latter arrangements allow a motion of the parts of the jet in spontaneously formed surfaces.

As an example of the use of such a grating or thread net I have in Fig. 32 shown a rectifier for multiphase current (in the example shown three phase current). $V^1$, $V^2$, $V^3$ is the generator for the current, and $M^1$, $M^2$, $M^3$ are the magnet windings of a revolving field. The jet S passes this field and then strikes a conducting net or grating R. This grating and the jet tube T are connected with opposite poles of a source of direct current B in such a manner that a direct current is flowing in the uppermost part of the jet. The interaction between this current and the revolving field will cause the striking point of the jet in the combined electrode $E^1$, $E^2$, $E^3$ arranged under the grating to partake of a circular movement with a frequency which is equal to the frequency of each of the phases in the three phase current. Through arrangement of the electrode at a suitable distance from the field the striking point of the jet can be made to pass the radially arranged insulating walls $P^1$, $P^2$, $P^3$ which separate the sector shaped electrode pieces $E^1$, $E^2$, $E^3$ just at the moments of the three phases which are most favorable for the rectification of the three phase current. The rectified current will then with the connections shown in the figure flow through the line $a\ b$.

In the rectifier shown in Fig. 32 it is of course the jet piece between the grating R and the electrode which forms the conducting liquid bridge. It must further be remarked that according to the principle here indicated other forms of apparatus for the rectification of multiphase current can be built; for instance the latticed conductor shown may be substituted by other electrode forms.

Having thus fully described my invention I claim as new and desire to secure by Letters Patent:

1. An electric device comprising means for producing a conductive liquid jet, means for imparting oscillatory movement to the said jet, at least one electrode independent of the said means for producing the jet, and in permanent contact with the jet during the said oscillatory movement, and at least one electrode adapted to be in or out of contact with the said jet during the said movement.

2. An electric device comprising means for producing a conductive liquid jet, means for imparting oscillatory movement to the said jet, an electrode in permanent contact with the jet during the said oscillatory movement, and at least one electrode adapted to be in or out of contact with the said jet during the said movement.

3. An electric device comprising means for producing a conductive liquid jet, means for imparting oscillatory movement to the said jet, an electrode independent of the said means for producing the jet and in permanent contact with the jet during the said oscillatory movement, a plurality of electrodes adapted to be in or out of contact with the said jet during the said movement, and current controlling means inserted between the said electrodes.

4. An electric device comprising a main electrode, a plurality of additional electrodes arranged in spaced relation with respect to each other and to the main electrode, a liquid conducting jet impinging on the main electrode, and means for imparting to the jet an oscillatory movement along the main electrode and concomitantly causing the jet to impinge also on the additional electrodes one after another whereby the latter are consecutively connected through the jet with the main electrode.

5. An electric device comprising a main electrode, a plurality of additional electrodes arranged in spaced relation with respect to each other and to the main electrode, a liquid conducting jet impinging upon the main electrode, and means for imparting to the jet an oscillatory movement along the main electrode synchronously with the oscillations of an alternating current, and concomitantly causing the jet to impinge also on the additional electrodes one after another whereby the latter are consecutively connected through the jet with the main electrode.

In testimony whereof I have affixed my signature in presence of two witnesses.

JULIUS FREDERIK GEORG POUL HARTMANN.

Witnesses:
 VIGGO BLOM,
 A. CHRISTAFFERSEN.